(12) United States Patent
Lee et al.

(10) Patent No.: US 11,780,360 B2
(45) Date of Patent: Oct. 10, 2023

(54) CAMERA-PUDDLE LAMP INTEGRATED APPARATUS AND SIDE MIRROR INCLUDING THE SAME

(71) Applicant: HYUNDAI MOBIS CO., LTD., Seoul (KR)

(72) Inventors: Won Moo Lee, Yongin-si (KR); Hyun Seok Lee, Seoul (KR); Tae Youn Lee, Suwon-si (KR); Eun Ho Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 219 days.

(21) Appl. No.: 17/344,878

(22) Filed: Jun. 10, 2021

(65) Prior Publication Data
US 2021/0387565 A1      Dec. 16, 2021

(30) Foreign Application Priority Data

Jun. 11, 2020   (KR) .......................... 10-2020-0070834

(51) Int. Cl.
| | | |
|---|---|---|
| B60Q 1/00 | (2006.01) | |
| F21S 41/32 | (2018.01) | |
| G03B 30/00 | (2021.01) | |
| B60Q 1/24 | (2006.01) | |
| B60Q 1/26 | (2006.01) | |
| B60R 1/12 | (2006.01) | |
| F21W 102/40 | (2018.01) | |

(52) U.S. Cl.
CPC ............. *B60Q 1/0023* (2013.01); *B60Q 1/24* (2013.01); *B60Q 1/247* (2022.05); *B60Q 1/2665* (2013.01); *B60R 1/1207* (2013.01); *F21S 41/32* (2018.01); *G03B 30/00* (2021.01); *F21W 2102/40* (2018.01)

(58) Field of Classification Search
CPC ........ B60Q 1/0023; B60Q 1/24; B60Q 1/247; B60Q 1/2665; F21S 41/32; G03B 30/00; B60R 1/1207; F21W 2102/40
USPC ........................................... 359/839; 362/494
See application file for complete search history.

(56) References Cited

U.S. PATENT DOCUMENTS

| | | | |
|---|---|---|---|
| 11,215,337 B2* | 1/2022 | Lee ..................... | B60Q 1/2665 |
| 11,312,306 B2* | 4/2022 | Lee ..................... | G03B 15/05 |
| 11,603,032 B2* | 3/2023 | Lee ..................... | F21S 41/322 |
| 2018/0257546 A1* | 9/2018 | Johnson ................ | B60Q 1/247 |

* cited by examiner

*Primary Examiner* — Laura K Tso
(74) *Attorney, Agent, or Firm* — Novo TechIP International PLLC

(57) ABSTRACT

A camera-puddle lamp integrated apparatus is disclosed. The apparatus comprising a lens module; an image sensor; a light source; and a translucent mirror, the light source is disposed so that light emitted from the light source intersects an optical axis of the lens module in the first area and disposed in a second area outside the first area, at least a portion of the emitted light is incident to the rear of the lens module by the translucent mirror and projected in front of the lens module through the lens module so that the camera-puddle lamp integrated apparatus operates as a puddle lamp, and image light passes through the lens module from a photographing area and at least a portion of the image light is incident on the image sensor through the translucent mirror so that the camera-puddle lamp integrated apparatus operates as a camera.

10 Claims, 10 Drawing Sheets

(a)

(b)

(a)

(b)

(a)

(b)

(c)

(a)

(b)

(a)

(b)

(a)

(b)

(c)

CAMERA-PUDDLE LAMP INTEGRATED APPARATUS AND SIDE MIRROR INCLUDING THE SAME

CROSS-REFERENCE TO RELATED APPLICATIONS

This application claims priority to and the benefit of Korean Patent Application No. 10-2020-0070834, filed on Jun. 11, 2020, the disclosure of which is incorporated herein by reference in its entirety.

BACKGROUND OF THE INVENTION

1. Field of the Invention

The present disclosure relates to a camera-puddle lamp integrated apparatus and a vehicle side mirror including the same.

2. Discussion of Related Art

Contents described in this section merely provide background information on the present embodiment and do not constitute the related art.

Among various functions for providing convenience to a driver, there are puddle lamps, surround view monitors (SVMs), or around view cameras.

An SVM is an integrated camera system for providing information on the surrounding environment of a vehicle when parking and is placed in the vehicle to photograph areas in all directions from the vehicle. In general, an SVM camera module 102 for photographing right and left areas is mounted on each of two side mirrors 1 at right and left sides of the vehicle (referring to FIG. 1).

A puddle lamp 104 serves to provide illumination and a luxurious image around a boarding area to a driver at night. In addition, various convenience and safety modules such as side repeaters 106, which are right and left signal lamps, may be mounted on a side mirror 1.

In terms of aerodynamics, it is preferable that a size of the side mirror 1 is small, but an internal space reduction according to the size reduction makes it difficult to mount various additional modules. In particular, in the case of a camera monitor system (CMS) in which a size of a side mirror is dramatically reduced by installing only a camera instead of a mirror to reduce wind noise and improve fuel economy, the CMS has a small size which is insufficient for installing all necessary function modules.

Meanwhile, as the number of modules disposed in the side mirror 1 increases, the number of design considerations for ensuring watertightness of each module increases and costs increase.

BRIEF SUMMARY OF THE INVENTION

The present disclosure is directed to providing a side mirror, in which an occupied space in the side mirror is minimized by integrating a camera for a surround view monitor (SVM) with a puddle lamp into one part so that watertightness of an integrated module is easily secured and manufacturing costs are reduced, and providing a camera-puddle lamp integrated module useful for reduction in size of a camera monitor system (CMS).

According to one embodiment, the present disclosure provides a camera-puddle lamp integrated apparatus comprising: a lens module; an image sensor; a light source; and a translucent mirror, wherein the image sensor is spaced apart from a rear of the lens module with a first area therebetween, the light source is disposed so that light emitted from the light source intersects an optical axis of the lens module in the first area and disposed in a second area outside the first area, at least a portion of the emitted light is incident to the rear of the lens module by the translucent mirror and projected in front of the lens module through the lens module so that the camera-puddle lamp integrated apparatus operates as a puddle lamp, and image light passes through the lens module from a photographing area and at least a portion of the image light is incident on the image sensor through the translucent mirror so that the camera-puddle lamp integrated apparatus operates as a camera.

DETAILED DESCRIPTION OF THE INVENTION

In addition, terms such as "part" and "module" mean a unit that processes at least one function or operation and may be implemented by hardware or software, or a combination of hardware and software.

Figure 1:
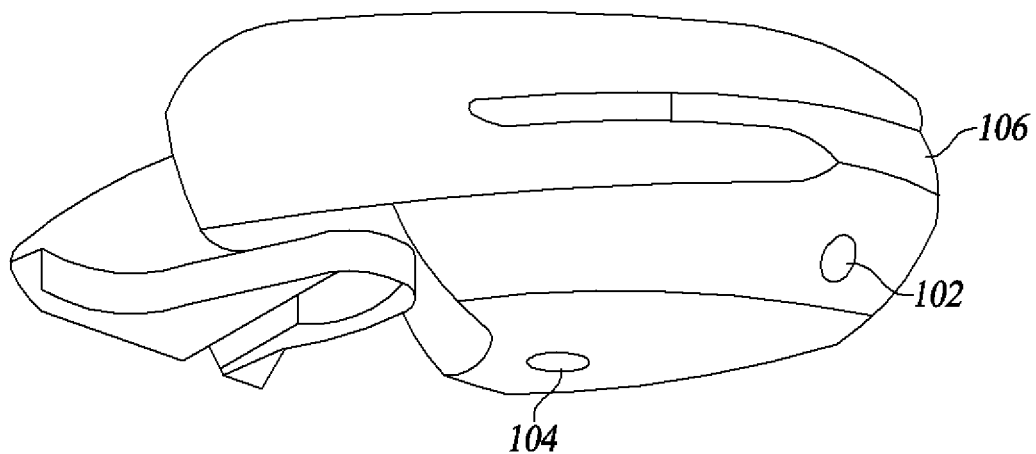
FIG. 1 is a perspective view of a general side mirror including various modules.
Figure 2:
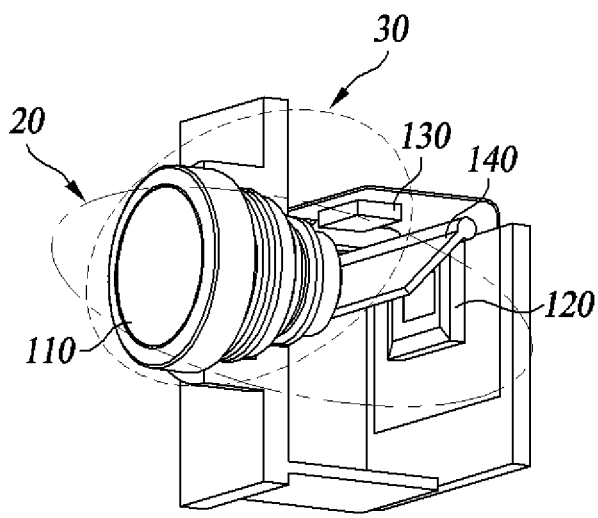
FIG. 2 is a perspective view illustrating a camera-puddle lamp integrated apparatus according to a first embodiment of the present disclosure.

FIG. 2 is a perspective view illustrating a camera-puddle lamp integrated apparatus according to a first embodiment of the present disclosure.

Referring to FIG. 2, a camera-puddle lamp integrated apparatus 10 according to the first embodiment of the present disclosure includes a lens module 110, an image sensor 120, a light source 130, and a mirror module 140. A camera module 20 and a puddle lamp module 30 share the lens module 110, and the image sensor 120 is spaced apart from the rear of the lens module 110 with a first area therebetween. The mirror module 140 is disposed between the rear of the lens module 110 and the image sensor 120 of the camera module 20. The mirror module 140 includes a mirror 142, and the mirror 142 rotates about one side thereof as a rotation axis so that an operation state of the integrated apparatus 10 is switched.

A state, in which the mirror 142 of the mirror module 140 is lowered to the first area between the rear of the lens module 110 and the image sensor 120 so that an optical axis of the lens module 110 is refracted to be directed to the light source 130 of the puddle lamp module 30, is defined as a first state. A state, in which the mirror 142 of the mirror module 140 rotates and moves to a second area outside the first area and is folded to be close to the light source 130 of the puddle lamp module 30 so that the optical axis of the lens module 110 proceeds to the image sensor 120 of the lens module 110 without interference with the mirror 142, is defined as a second state.

The camera-puddle lamp integrated apparatus 10 according to the first embodiment of the present disclosure operates in a puddle lamp mode when the mirror module 140 is in the first state and operates in a camera mode when the mirror module 140 is in the second state.

Figure 3:
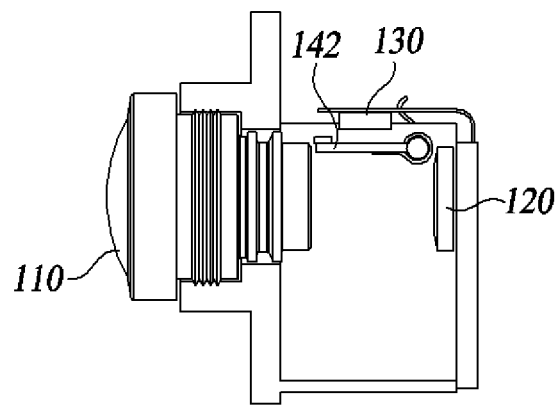
FIG. 3 is a conceptual diagram illustrating an operation of the camera-puddle lamp integrated apparatus according to the first embodiment of the present disclosure.
Figure 3:
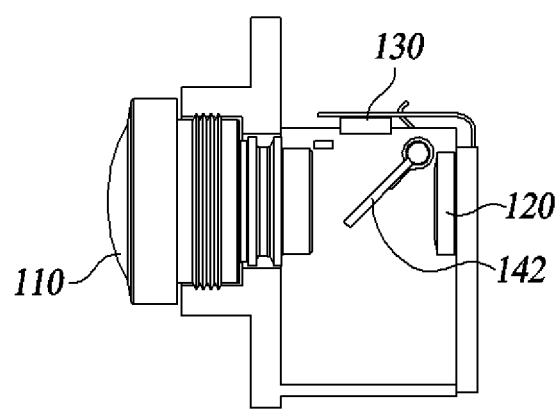

FIG. 3 is a conceptual diagram illustrating the operation of the camera-puddle lamp integrated apparatus according to the first embodiment of the present disclosure.

FIG. 3 illustrates the most basic layout of the camera-puddle lamp integrated apparatus 10 according to the first embodiment of the present disclosure. FIG. 3A illustrates the camera mode, and FIG. 3B illustrates the puddle lamp mode.

In the most basic layout according to one embodiment, the image sensor 120 is disposed behind the lens module 110 to be perpendicular to the optical axis of the lens module 110, and the light source 130 of the puddle lamp module 30 is disposed on a flat surface which is perpendicular to the image sensor 120 and located outside an area through which imaging light behind the lens module 110 passes.

A space in which the mirror 142 of the mirror module 140 may be rotated to be in a first state is secured between the rear of the lens module 110 and the image sensor 120. In a general camera module, the image sensor 120 is disposed close to the rear of the lens module 110. Meanwhile, in the camera-puddle lamp integrated apparatus 10 according to one embodiment, the rear of the lens module 110 and the image sensor 120 are separated by a larger distance due to a space for accommodating the mirror module 140. To this end, the lens module 110 according to one embodiment may be designed to form a relatively long focal length in a rearward direction.

The light source 130 of the puddle lamp module 30 may be disposed on one flat surface parallel to the optical axis of the lens module 110. A position of the light source 130, specifically, a distance from the optical axis of the lens module 110 to the flat surface on which the light source 130 is disposed, may be determined in consideration of optical characteristics of the lens module 110, a height of the side mirror 1 from a ground, or the like.

That is, in one embodiment, the flat surface on which the light source 130 of the puddle lamp module 30 is placed and the mirror 142 in the second state are parallel to the optical axis of the lens module 110, and the image sensor 120 of the lens module 110 is disposed perpendicular to the optical axis of the lens module 110. In the first state, for example, the mirror 142 may have an angle of 45° with respect to the optical axis of the lens module 110 and the image sensor 120. For convenience of description, it is illustrated that the flat surface on which the light source 130 of the puddle lamp module 30 is placed and the image sensor 120 are perpendicular to each other, and the mirror 142 is placed at 45° between the light source 130 and the puddle lamp module 30 in the first state. However, the present disclosure is not limited thereto, and the arrangement angles may be different as necessary.

Figure 4:
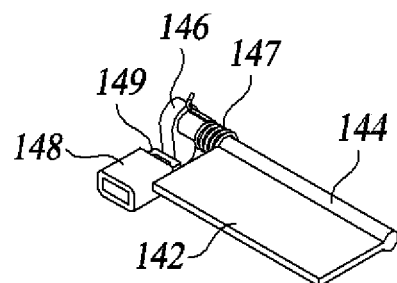
FIG. 4 is a perspective view of a reflector structure of the camera-puddle lamp integrated apparatus according to the first embodiment of the present disclosure.
Figure 4:
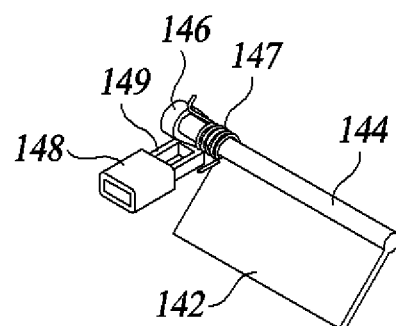

FIG. 4 is a perspective view of a reflector structure of the camera-puddle lamp integrated apparatus according to the first embodiment of the present disclosure.

The mirror module 140 may include the mirror 142, a mirror rotation shaft 144, a cam bar 146 fixed to one end of the mirror rotation shaft 144, a torsion spring 147, a solenoid 148, and a push pin 149. However, the present disclosure is not limited thereto and may include various structures capable of providing the above-described first state and second state.

Referring to FIG. 4, FIG. 4A illustrates a state in which the mirror 142 is folded to be parallel with the flat surface on which the light source 130 of the puddle lamp module 30 is placed in the first state. The push pin 149 which is moved forward and backward by the solenoid 148 is in a short state, and the cam bar 146 is rotated in a clockwise direction by the torsion spring 147. This position may correspond to a minimum stroke position of the solenoid 148.

FIG. 4B illustrates a state in which the mirror 142 is rotated to intersect the optical axis of the lens module 110 in the second state. The push pin 149 connected to the solenoid 148 is in a state that has been moved to a position corresponding to a maximum length and pushes the cam bar 146 to rotate the mirror rotation shaft 144 in a counterclockwise direction, and the torsion spring 147 is compressed in the first state. Accordingly, the mirror 142 is rotated to have, for example, an angle of 45° with respect to the optical axis of the lens module 110.

The cam bar 146 and/or the push pin 149 may be made of a material that wears less even with frequent operations and does not generate dust due to wear. Alternatively, the material may have a small coefficient of friction therebetween. For example, the cam bar 146 and/or the push pin 149 may be made of an Ultra-High Molecular Weight Polyethylene (UHMWPE) material. The UHMWPE not only has a very low coefficient of friction but also has a very long chain of molecules. Accordingly, even when wear occurs, an amount of particles dropped out from the UHMWPE is very small. In the case of the camera-puddle lamp integrated apparatus 10 according to one embodiment of the present disclosure, which requires high watertight performance or the like, to be used in a vehicle, it is necessary to prevent occurrence of dust inside even when the integrated apparatus 10 is operated for a long time in a completely sealed state. This is because, when dust is generated, the dust may adhere to the image sensor 120, and thus, quality of an image to be photographed may be degraded.

Meanwhile, the light source 130 of the puddle lamp module 30 may be, for example, a light emitting diode (LED) light source. In general, an operation time in the puddle lamp mode is not long. However, the temperature of the light source 130 and the surroundings thereof may become a high temperature due to heat generated by the light source 130. Therefore, a surface of the mirror 142 and the light source 130 may be designed to have an appropriate distance in the second state.

In addition, logos, letters, patterns, or color patterns, and the like may be etched and/or laminated on a reflective surface of the mirror 142. In general, the puddle lamp is formed to provide an aesthetic value to a driver by providing illumination that incorporates these design elements. In the case of the puddle lamp module 30 according to one embodiment, the design element may be included in the illumination by using a pattern mask added to the surface of the mirror 142.

Figure 5:
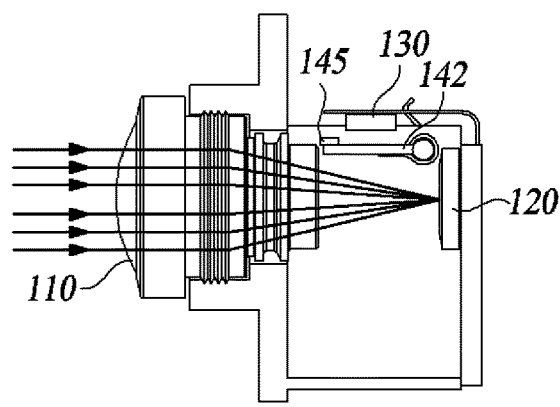
FIG. 5 is a conceptual diagram illustrating an optical function of the camera-puddle lamp integrated apparatus according to the first embodiment of the present disclosure.
Figure 5:
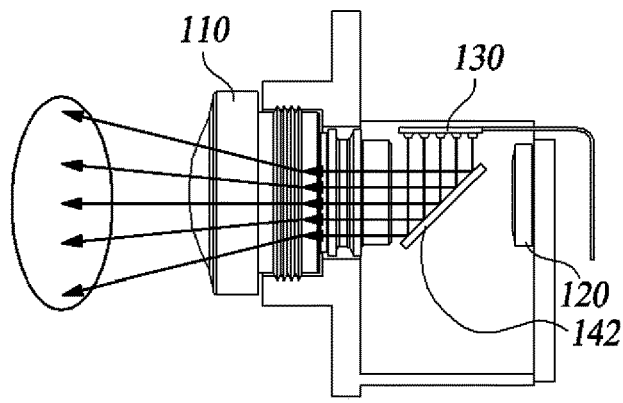
Figure 5:
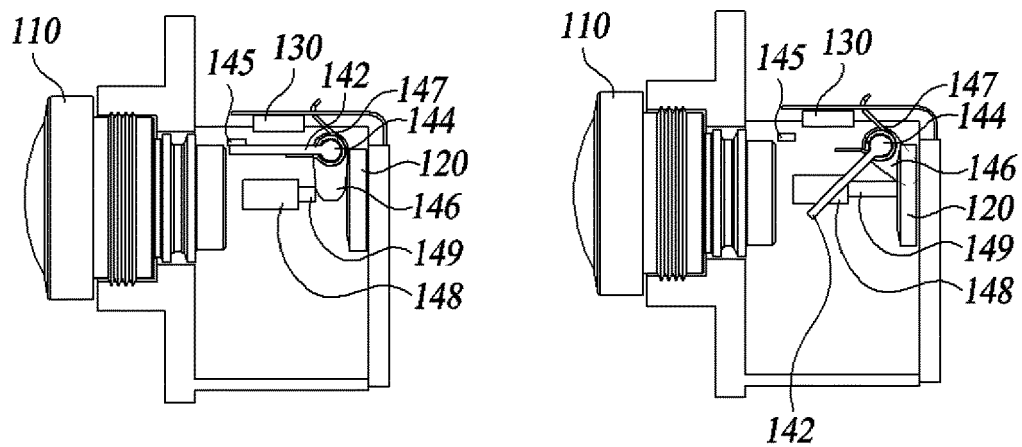

FIG. 5 is a conceptual diagram illustrating an optical function of the camera-puddle lamp integrated apparatus according to the first embodiment of the present disclosure.

FIG. 5 illustrates concepts of image capturing and lamp lighting according to the first embodiment. In the illustrated example, it is assumed that a distance from the camera-puddle lamp integrated apparatus 10 to the image capturing area and a distance from the camera-puddle lamp integrated apparatus 10 to an area illuminated by the puddle lamp module 30 are similar to each other. When the light source 130 and the image sensor 120 are disposed to be located at the same focal distance to the rear of the lens module 110 due to the mirror 142 inclined at an angle of 45° with respect to the image sensor 120, an area to be photographed and an area illuminated by a lamp may be formed to be the same area at the same distance.

Although not illustrated, the first embodiment illustrated in FIG. 5 may be variously modified to improve the performance of the camera module 20 and the puddle lamp module 30 and operate the camera module 20 and the puddle lamp module 30 more efficiently.

The area photographed by the camera and the area illuminated by the puddle lamp may be the same. However, the areas may be different from each other. For example, the camera may be formed to photograph a wider area than the puddle lamp. In addition, the camera may be formed so that a center of the photographing area is farther out of the vehicle than a center of a puddle lamp illumination area.

In general, a camera mounted on the side mirror 1 is disposed so that an optical axis of the camera is not perpendicular to the ground. Since a preferred photographing area is around the vehicle, the optical axis is disposed to face the front and the ground at a location spaced apart from the vehicle by a predetermined distance. In addition, in the case of the puddle lamp, it may be desirable to form the puddle lamp to illuminate a narrower area than the photographing area in order to efficiently utilize an amount of light of a limited light source. That is, when the same lens module 110 is used, an arrangement different from an angular arrangement illustrated in FIGS. 2 to 5 may be advantageous. For example, in the first state, the optical axis of the lens module 110 and/or the central axis of the light source 130 of the puddle lamp module 30 may have an angle different from the 45° angle from the mirror and/or the light from the light source 130 may be formed to pass through a portion or other areas of the lens module 110. That is, by adjusting a size of the mirror 142 or the angle in the first state, the illumination may be more concentrated in an area closer to the vehicle than in the photographing area of the camera.

Preferably, the area illuminated by the puddle lamp may be smaller than the photographing area, and this modified design may also provide an advantage of miniaturizing the size of the mirror 142.

In another modified embodiment, the mirror 142 may be manufactured in the form of a concave mirror. The concave mirror may have a parabolic shape. One or more light sources 130 of the puddle lamp module 30 may be disposed on a flat surface, and light emitted from the plurality of light sources 130 may be adjusted so that the area narrower than the photographing area of the camera due to additional lensing effects of the mirror 142 and/or a position different from a center of the photographing area of the camera, for example, a position close to a door step of the vehicle, may be the center of the illumination. If necessary, the flat surface on which the light source 130 of the puddle lamp module 30 is disposed may also be disposed to be inclined at a predetermined angle with respect to the optical axis of the lens module 110.

That is, as a modified embodiment, using the angle of the mirror 142 in the first state, a shape of the reflective surface of the mirror 142, inclination setting of the layout of the light source 130 with respect to the optical axis, or the like, it is possible to provide different optimized characteristics while using the same lens module used for the camera module 20.

Meanwhile, in the case of the image sensor 120 of the camera module 20, an embodiment in which the image sensor 120 is disposed in an inclined shape not perpendicular to the optical axis of the lens module 110 may also be considered. In general, a surround view monitor (SVM) camera includes a wide-angle lens or an ultrawide-angle lens to provide a wide imaging area and a deep focus depth. In addition, in general, since a distance from the rear of the lens module 110 to the image sensor is short, optical effects obtained by adjusting the position of the image sensor with respect to the optical axis of the lens are not considered. Meanwhile, in the case of the present disclosure, similar to the SVM camera, the wide-angle lens or the ultrawide-angle lens is applied. However, since the distance from the rear of the lens module 110 to the image sensor 120 is relatively long, it is possible to apply concepts of tilt and shift which are well known in a field of imaging optics.

For example, in the case of the camera module 20 disposed to be an optical axis inclined to the outside of the vehicle from a virtual vertical line perpendicular from the ground at the position of the side mirror 1, the ground and the image sensor 120 are not parallel to each other and are inclined. Accordingly, a significant difference in light path and a difference in focus occur between the ground close to the vehicle and a location far from the vehicle from the image sensor 120. This means that the optical depth area of the photographing area passes through the lens module 110 and is projected to the image sensor 120 in an inclined state. For an object to be photographed that is inclined to a certain degree with respect to the image sensor 120, generally, a depth of the ultrawide-angle lens is deep, and thus, there is no problem in obtaining an image in focus. However, a photographing image of a largely inclined area includes large errors in size and shape. This may be corrected by numerically post-processing the photographed image. However, when the image sensor 120 is tilted to an appropriate level in consideration of the inclined angle between the ground as the photographing area and the optical axis of the lens, distortion may be greatly reduced and an amount of post-processing calculation may be greatly reduced. A direction in which the image sensor 120 is tilted may be selected in consideration of an optical design of the lens module 110. For example, in the case of a lens configured in a form in which a nodal point is formed in the lens module 110 and an image is inverted, a projected image passing through the rearmost lens is inclined in a direction opposite to the ground, and in this case, the image sensor 120 is tilted to be plane symmetrical based on the ground and a surface of the lens. In the case of the lens module 110 in which the nodal point is formed outside the lens module 110 and the area of the image sensor 120, the lens module 110 is tilted so as to be parallel to the image sensor 120 and the ground.

Moreover, also in the concept of the shift, by offsetting the position of the image sensor 120 on a plane perpendicular to the optical axis, the image sensor 120 may be formed to correct the extent to which sizes of a near-field and far-field images are photographed differently.

An embodiment to which the tilt and/or shift concept is applied may be particularly useful in the case of a camera monitor system (CMS) in which the size of the side mirror 1 is extremely reduced. Compared to the conventional side mirror 1, the CMS is very small in size and disposed to be closer to the vehicle. Accordingly, in the case of the CMS, the camera module 20 may be disposed such that the optical axis faces a ground position further away from the vehicle in order to provide an appropriate photographing area. That is, the ground and the image sensor 120 are inclined at a larger angle, and the imaging light corresponding to the photographed image is incident on the image sensor 120 in a largely inclined state. Accordingly, in the modified embodiment to which the tilt and/or shift concept is applied, distortion is reduced, and thus an image requiring only a small level of correction may be provided.

Meanwhile, referring to FIG. 5, a stopper 145, which absorbs impact transmitted to the mirror 142 and determines a stop position when the mirror 142 in the second state of being folded by a force of the torsion spring 147 rotates and moves to enter the first state, may be disposed on a member (not illustrated) on the flat surface on which the light source 130 is disposed.

Figure 6:
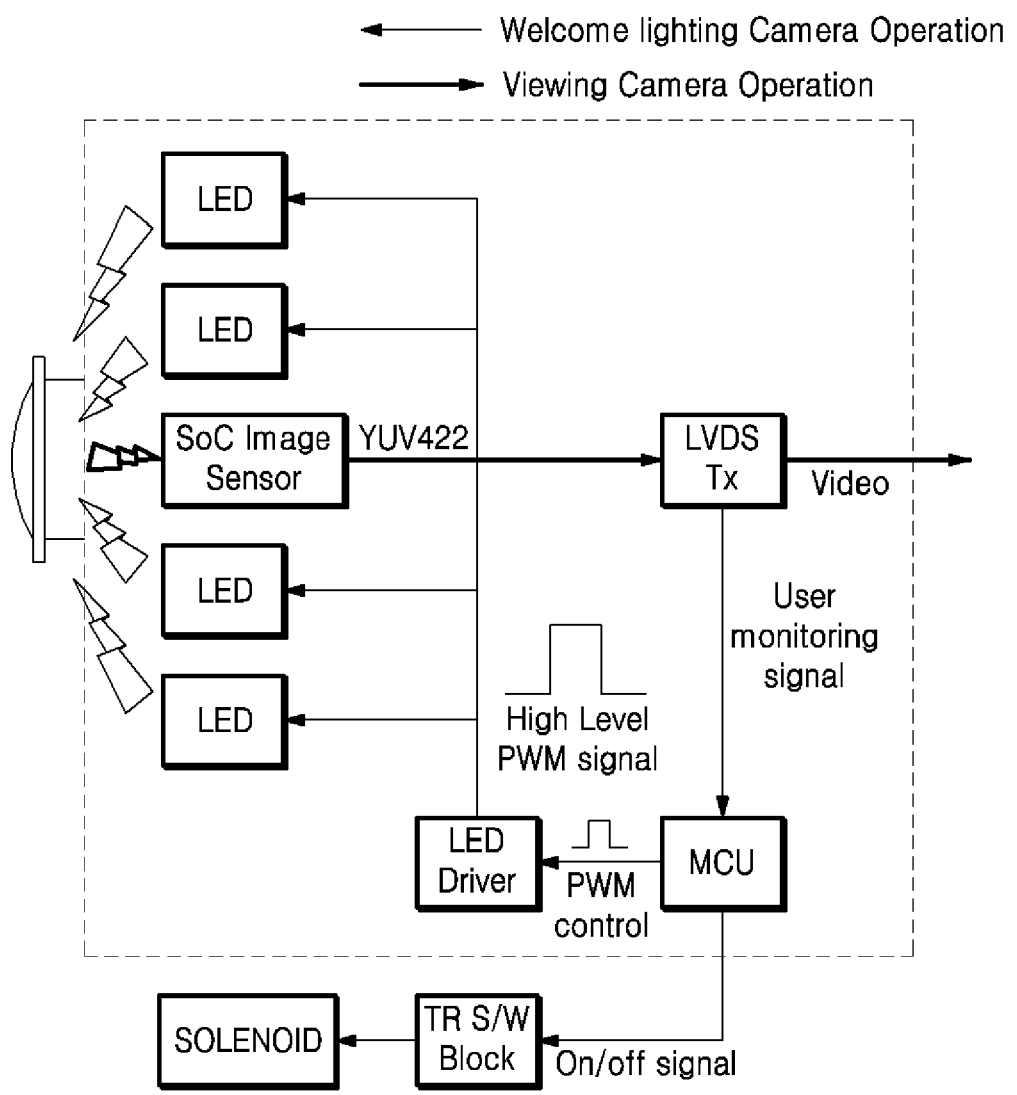
FIG. 6 is a conceptual diagram illustrating a control system of the camera-puddle lamp integrated apparatus according to the first embodiment of the present disclosure.

FIG. 6 is a conceptual diagram illustrating a control system of the camera-puddle lamp integrated apparatus according to the first embodiment of the present disclosure.

Referring to FIG. 6, the camera-puddle lamp integrated apparatus 10 according to the first embodiment may be configured by adding an LED driver chip set related to a puddle lamp to an existing SVM camera controller.

A control of the puddle lamp may be performed in the following sequence.

In a controller, a micro controller unit (MCU) receives user information (LVDS Tx) and generates a pulse width modulation (PWM) control signal for a solenoid control. Next, the LED driver is driven to generate a multi-channel high-voltage PWM signal to turn on an LED light source. That is, the mirror in the second state rotates and moves to enter the first state, and the light of the light source is projected to the outside through the lens module 110. In the MCU, an intensity of the LED light source may be adjusted by controlling a pulse width of the PWM signal. The solenoid control may be performed by controlling, for example, a metal-oxide semiconductor (MOS) transistor switch connected to the solenoid in the MCU.

Figure 7:
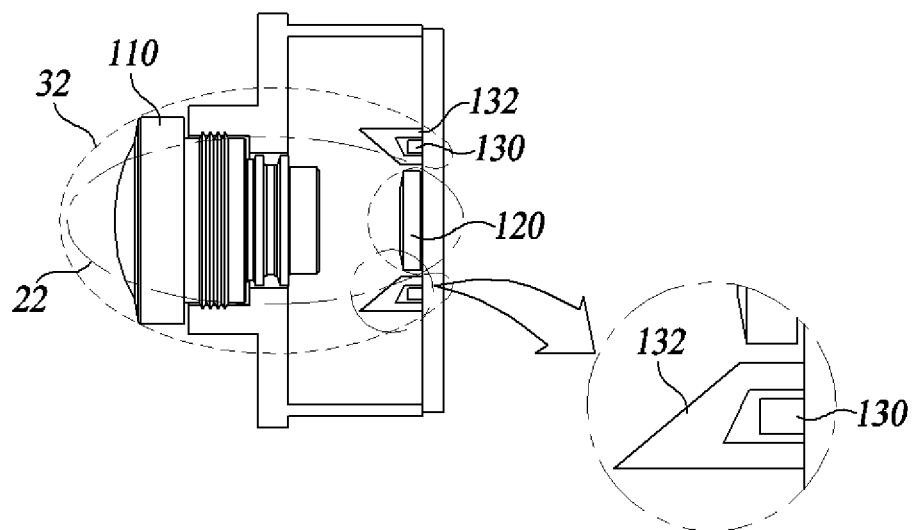
FIG. 7 is a conceptual diagram of a camera-puddle lamp integrated apparatus according to a second embodiment of the present disclosure.
Figure 7:
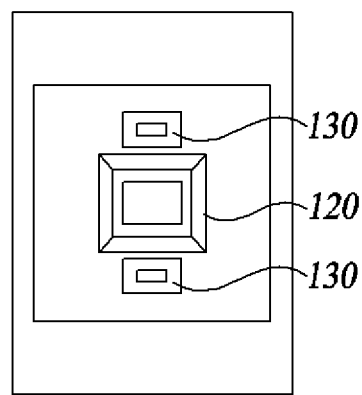

FIG. 7 is a conceptual diagram of a camera-puddle lamp integrated apparatus according to a second embodiment of the present disclosure.

Referring to FIG. 7, in a camera-puddle lamp integrated apparatus 12 according to the second embodiment of the present disclosure, a camera module 22 and a puddle lamp module 32 share the lens module 110, and the puddle lamp module 32 is disposed at a peripheral portion of the image sensor 120. The puddle lamp module 32 according to one embodiment includes a separate optical unit 132 so that light emitted from the light source 130 is directed to a rear end of the lens module 110. In FIG. 7, one end of the optical unit 132 is illustrated to have a wedge shape, but this is only for conceptually illustrating a configuration of one embodiment and is not limited thereto, and various shapes including a circular lens group capable of changing a path of the emitted light may be used.

In the camera-puddle lamp integrated apparatus 12 according to one embodiment, the light source 130 of the puddle lamp module 32 and the image sensor 120 of the camera module 22 are mounted on the same component (that is, the same printed circuit board), and thus, a structure thereof is simple and easy to manufacture. In addition, by simply forming a wider cooling structure (not illustrated) disposed on a rear surface of the printed circuit board on which the image sensor 120 is disposed, heat generated from the light source 130 may also be cooled. In general, the image sensor 120 having a high resolution generates high heat, and in order to cool the image sensor 120, a cooling structure such as a heat radiation plate is provided on the rear surface of the printed circuit board on which the image sensor 120 is disposed. In one embodiment, the light source 130 of the puddle lamp module 32 is disposed around the image sensor 120, and a cooling structure may be formed on the rear surface of the location of the light source 130.

In addition, since the camera-puddle lamp integrated apparatus 12 according to one embodiment does not include a driving mechanism and operates in a state where all components are fixed, product durability may be improved.

Preferably, the lens module 110 according to one embodiment is designed so that an image circle at the position of the image sensor 120 behind the lens module 110 is larger than the size of the image sensor 120, and thus, the light source 130 is included in the image circle.

Meanwhile, in order to effectively use an amount of light from the light source 130 for illumination, the light source 130 may be disposed to be coplanar to the image sensor 120 and a central axis of light emitted from the light source 130 may be inclined toward a center of the rear of the lens module 110 from a virtual line perpendicular to the surface of the image sensor 120.

The optical unit 132 included in the puddle lamp module 32 may direct the light emitted from the light source 130 toward the center of the rear of the lens module 110 but is not limited thereto, and if necessary, the optical unit 132 may be formed to direct the emitted light toward a position away from the center of the rear. For example, when the center of the photographing area of the camera module 22 and the center of the illumination area of the puddle lamp module 32 are formed to be different from each other, the optical unit 132 included in the puddle lamp module 32 may be formed to direct light emitted from the light source 130 toward a position rather than a center of a rear end of the lens module 110.

In addition, although it is illustrated that there are two light sources 130 of the puddle lamp module 32 in FIG. 7, the present disclosure is not limited thereto, and one or more light sources 130 may be disposed as necessary.

For example, although not illustrated, a plurality of light sources 130 may be disposed around the image sensor 120 in a ring shape. By collecting and using the amount of light from the plurality of light sources 130, it is possible to use a plurality of light sources each having a low output, and as a result, it is possible to expect the effect that heat generated from the light source 130 is uniformly distributed throughout the printed circuit board. In addition, compared to a case where the light source 130 is disposed on only a portion of a circumference of the image circle, the difficult design of the lens module 110 or the arrangement of the light source 130 for implementing a circular illumination area and the design of the optical unit 132 on the light source 130 may be simplified. In addition, by implementing the plurality of light sources 130 to emit different colors, it is possible to provide illumination of various colors by color combination.

Figure 8:
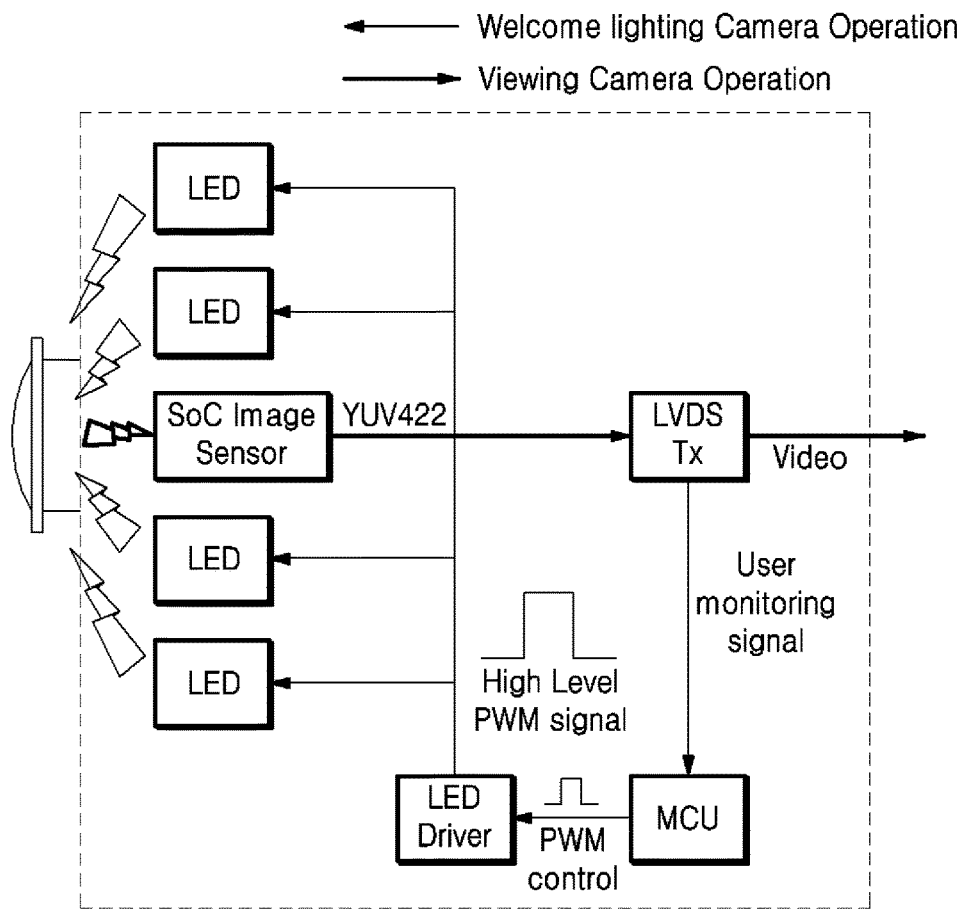
FIG. 8 is a conceptual diagram illustrating a control system of a camera-puddle lamp integrated apparatus according to the second embodiment of the present disclosure.

FIG. 8 is a conceptual diagram illustrating a control system of the camera-puddle lamp integrated apparatus according to the second embodiment of the present disclosure.

Compared with the control system according to the first embodiment of the present disclosure, in the case of the second embodiment, components for controlling an operating mechanism such as the solenoid are not required, and switching of the operation states of the puddle lamp module 32 and the camera module 22 may be easily controlled electrically.

Figure 9:
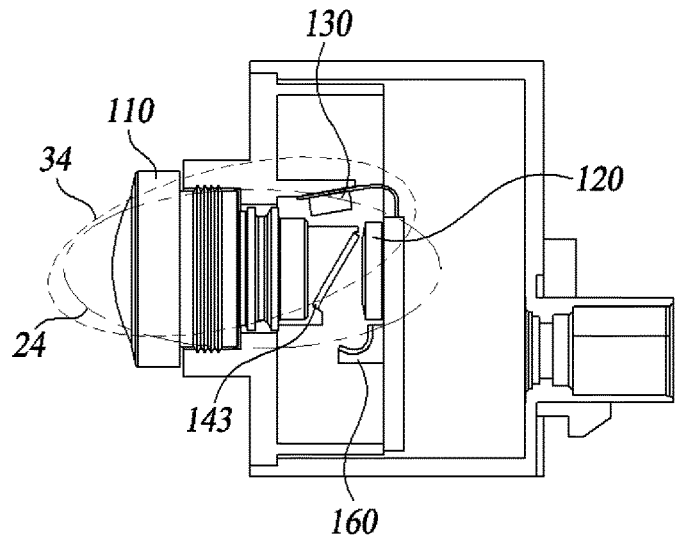
FIG. 9 is a side view of a camera-puddle lamp integrated apparatus according to a third embodiment of the present disclosure.

FIG. 9 is a side view of a camera-puddle lamp integrated apparatus according to a third embodiment of the present disclosure.

Referring to FIG. 9, in a camera-puddle lamp integrated apparatus 14 according to the third embodiment of the present disclosure, a camera module 24 and a puddle lamp module 34 share the lens module 110, and the image sensor 120 is spaced apart from the rear of the lens module 110 with the first area therebetween. The light source 130 of the puddle lamp module 34 is disposed behind the lens module 110 and is disposed in a second area outside the first area. A light path of the light source 130 and an image light path incident on the image sensor 120 are formed to pass through the lens module 110 using the translucent mirror 143 disposed at the rear of the lens module 110. The translucent mirror 143 may be fixed to a front housing of the camera module 32 on which the lens module 110 is mounted.

In addition, in order to more efficiently use the light emitted from the light source 130 of the puddle lamp module 34, a reflector 160 including lensing effects is disposed at a first position spaced apart from the image sensor 120 beyond the translucent mirror 143 from a traveling direction of the light emitted from the light source 130 of the puddle lamp module 34. A central axis of the light emitted from the light source 130 is disposed in a direction toward a center of the reflector 160, and the reflector 160 is formed to reflect the light emitted from the light source 130 toward the rear of the lens module 110.

Figure 10:
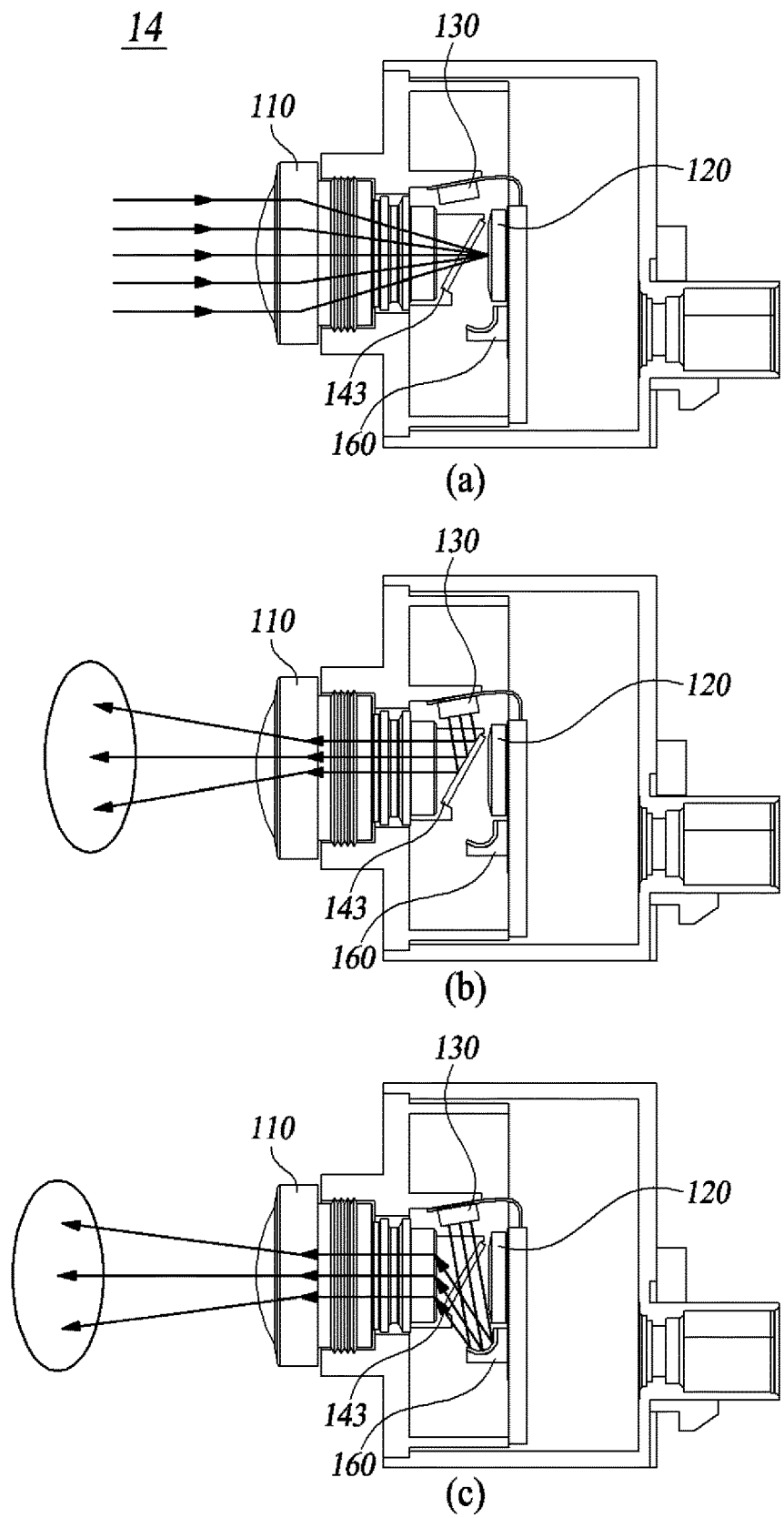
FIG. 10 is a conceptual diagram illustrating an operation of the camera-puddle lamp integrated apparatus according to the third embodiment of the present disclosure.

FIG. 10 is a conceptual diagram illustrating an operation of the camera-puddle lamp integrated apparatus according to the third embodiment of the present disclosure.

Referring to FIG. 10, when the camera-puddle lamp integrated apparatus 14 according to one embodiment is operated in the camera mode, the image incident through the lens module 110 passes through the translucent mirror 143 and is transferred to the image sensor 120 in a state where the light source 130 of the puddle lamp module 34 is turned off, and thus, the image is captured by the image sensor 120.

An amount of light passing through or reflected from the translucent mirror 143 decreases. While the image incident on the image sensor 120 passes through the translucent mirror 143, the amount of light decreases. However, an appropriate level of image quality may be secured by increasing sensitivity of the image sensor 120.

In the case of the puddle lamp module 34, a portion of the light emitted from the light source 130 is reflected by the translucent mirror 143 to enter the lens module 110, and the rest of the light passes through the translucent mirror 143. The reflector 160 serves to reflect the light of the light source that has passed through the translucent mirror 143 to be incident on the rear of the lens module 110. At least a portion of the light that has passed through the translucent mirror 143 is incident on the lens again by the reflector 160, and thus, it is possible to more efficiently use the light from the light source of the puddle lamp. Meanwhile, for example, the reflector 160 may be formed to include lensing effects of focusing or expanding reflected light so that light density finally projected from the reflector 160 through the lens module 110 increases or a light projection area is widened. The reflector 160 may be a concave mirror, and the concave mirror may also be formed to provide a parabolic reflective lensing effect.

In the case of the third embodiment, there are no mechanically operating components therein, and a method of controlling operation states of the camera module 24 and the puddle lamp module 34 may adopt a method similar to the method of the second embodiment.

In a camera-puddle lamp integrated apparatus 16 according to a fourth embodiment of the present disclosure, the camera module 26 and the puddle lamp module 36 share the lens module 110. The puddle lamp module 36 includes the light source 130, and the light source 130 is formed to move in a direction perpendicular to the optical axis of the lens module 110. The image sensor 120 is spaced apart from the rear of the lens module 110 with the first area therebetween. The integrated apparatus 10 is formed to operate in the puddle lamp mode when the light source 130 moves and is disposed in the first area, and operate in the camera mode when the light source 130 moves and is disposed in the second area outside the first area. In the fourth embodiment, since the light source 130 moves in the direction perpendicular to the optical axis of the lens module 110, a size of the first area in the fourth embodiment may be smaller than that of the first area in the first embodiment. That is, in the fourth embodiment, a gap between the lens module 110 and the image sensor 120 may be formed to be narrower than that in the first embodiment.

The puddle lamp module 36 includes the light source 130, a spring 147a, a sliding bar 146a, and a solenoid 148. The light source 130 is fixed to one side of the sliding bar 146a, and a moving part of the solenoid 148 operated by a control signal may be connected to the other side of the sliding bar 146a. The spring 147a may be a compression spring or an extension spring to push or pull the sliding bar 146a when the puddle lamp mode is released and the light source 130 of the puddle lamp module 36 is moved and removed from the rear of the lens module 110 to operate in the camera mode.

The solenoid 148 is operated so that the sliding bar 146a is moved to extend in a direction toward the rear of the lens module 110, the light source 130 of the puddle lamp module 36 is inserted into the first area defined as the area between the rear of the lens module 110 and the image sensor 120 to be close to the center of the optical axis or adjacent to the optical axis, and thus, the puddle lamp is operated when the light source 130.

When power being supplied is cut off and the solenoid 148 is turned off, the sliding bar 146a is moved by the spring 147a and the light source 130 of the puddle lamp module 36 moves from the first area to the second area. Accordingly, only the image sensor 120 is present at the rear of the lens module 110 and is operated as a camera in this state.

The puddle lamp module 36 is disposed at a position closer to the image sensor 120 from the rear of the lens module 110. In consideration of this, a light source lens part may be further provided in front of the light source to control optical characteristics of the illumination projected to the front of the lens module 110.

In addition, in a mechanism part for the operation of the puddle lamp module 36, a size of the mechanism part may be reduced using a clip 150 which is a member having a " " shape, and heat generated from the light source 130 may be easily radiated to the outside.

Figure 11:
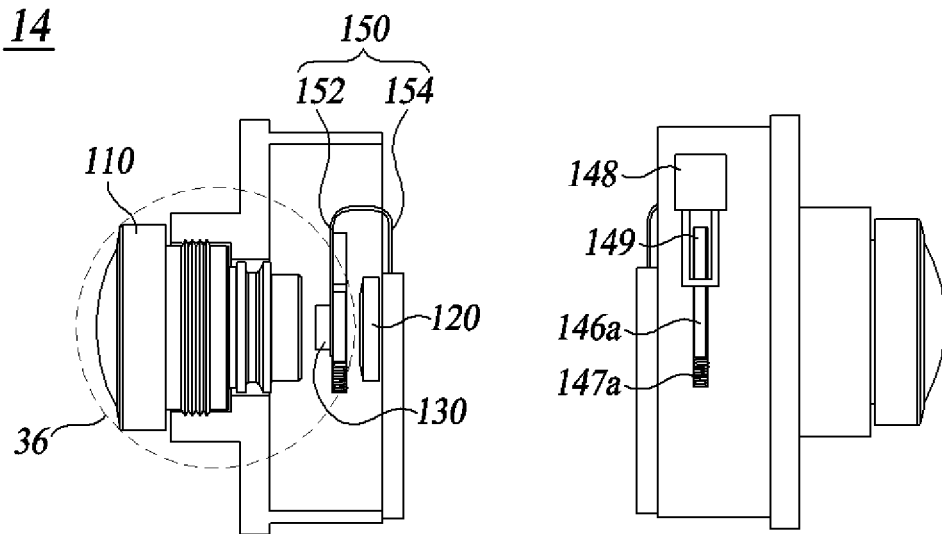
FIG. 11 is a side view of a camera-puddle lamp integrated apparatus according to a fourth embodiment of the present disclosure.
Figure 11:
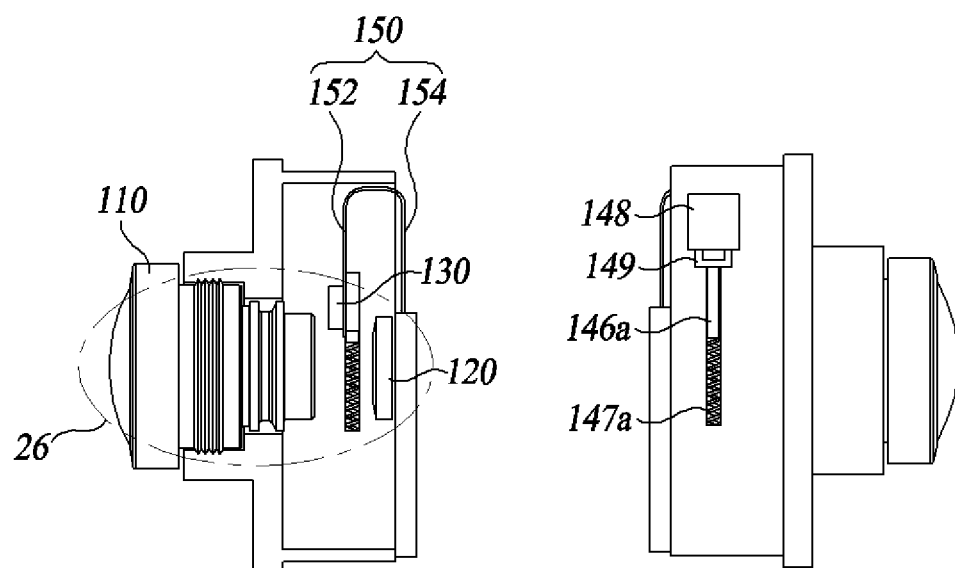

FIG. 11 is a side view of the camera-puddle lamp integrated apparatus according to the fourth embodiment of the present disclosure.

FIG. 11A illustrates right and left views of a state in which the apparatus operates as the puddle lamp viewed from both sides. FIG. 11B illustrates right and left views of a state in which the apparatus operates as the camera viewed from both sides.

In one embodiment, the spring 147a is a compression spring and is disposed on one side of the sliding bar 146a.

Referring to FIG. 11, the light source 130 according to one embodiment may be disposed on an outer surface of one protruding end 152 of the " " shaped clip 150. In the illustrated example, one surface of one side of the sliding bar 146a may be fixed to an inner surface of the one protruding end 152 of the clip 150. One protruding end 152 of the clip 150 is coupled to one side of the sliding bar 146a, and the other protruding end 154 is assembled to be slidable while pressing the rear surface of the printed circuit board including the image sensor 120. In the case of the embodiment including the clip 150, the light source 130 is disposed on the outer surface of the one protruding end 152 of the clip 150 instead of one side of the sliding bar 146a.

Figure 12:
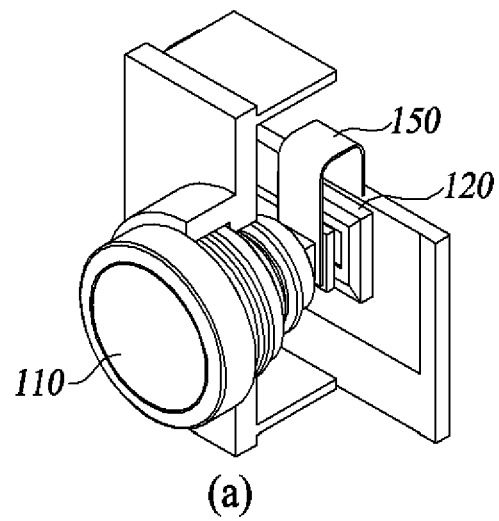
FIG. 12 is a perspective view of the camera-puddle lamp integrated apparatus according to the fourth embodiment of the present disclosure.
Figure 12:
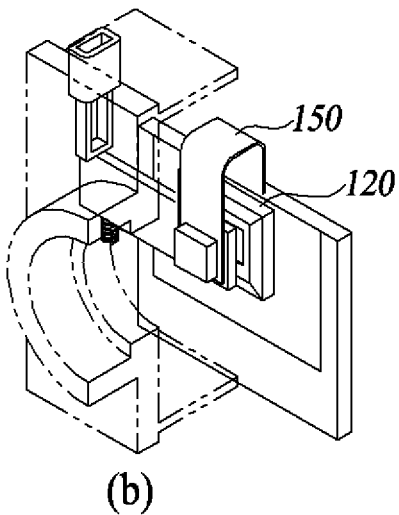
Figure 12:
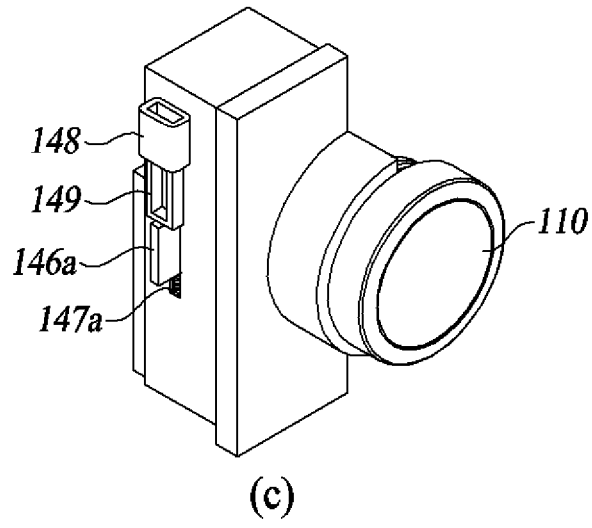

FIG. 12 is a perspective view of the camera-puddle lamp integrated apparatus according to the fourth embodiment of the present disclosure.

Referring to FIG. 12, the other protruding end 154 of the clip 150 may be guided to the rear surface of the printed circuit board on which the image sensor 120 is disposed and move in a direction parallel to a moving direction of the solenoid 148. A heat radiation structure (not illustrated) for radiating heat generated by the image sensor 120 to the outside may be provided on the rear surface of the printed circuit board on which the image sensor 120 is disposed. The other protruding end 154 of the clip 150 may be formed to move along a sliding guide structure (not illustrated) formed in the heat dissipation structure. The sliding bar 146a and the printed circuit board may be disposed inside the other protruding end 154 of the clip 150 and supported by a spring force of the clip 150. When the apparatus operates as the puddle lamp, a contact area of the clip with respect to the heat dissipation structure behind the printed circuit board is wider than when the apparatus operates as the camera. Therefore, heat generated by the light source 130 attached to the one protruding end 152 of the clip 150 may be effectively discharged through the clip 150 to the heat dissipating structure. On the other hand, when the apparatus operates as the camera, the contact area between the clip 150 and the heat dissipation structure decreases, and thus, the heat generated by the image sensor 120 may be transmitted less toward the light source moving to the second area.

Meanwhile, according to one embodiment, the puddle lamp module 36 is supported by the sliding bar 146a and the clip 150 in both horizontal and vertical directions, and thus, structural stability can be secured. In addition, compared to the first or third embodiments, in the fourth embodiment, since the flat and thin light source 130 of the puddle lamp module 36 is inserted from the side, there is an advantage in that a distance between the rear of the lens module 110 and the image sensor 120 may be short. In general, when the distance between the rear of the lens module 110 and the image sensor 120 is short, the size of the lens module 110 may be formed to be small.

In addition, in order to perform the illumination about a location different from the photographing area of the camera in the puddle lamp module 36, the light source 130 according to the fourth embodiment may be disposed not to enter the optical axis of the lens module 110. Since the light source 130 is spaced apart from the optical axis, the light source 130 may be formed so that the center of the illumination deviates from the center of the photographing area of the camera. For example, the center of the illumination may be closer to the vehicle than the photographing area of the camera. In addition, the light source 130 may be disposed on a curved shape so that the one protruding end 152 of the sliding bar 146a or the clip 150 is inclined in the moving direction of the sliding bar 146a. Accordingly, not vertical light but inclined light may be incident on the lens module 110 to provide illumination having a center position, an area size, or a shape different from those of the photographing area of the camera.

Meanwhile, although not illustrated, in order to display any one of a logo, a character, a pattern, and a color pattern in the illumination area of the puddle lamp, a pattern mask for displaying these may be further provided in front of the light source 130.

Similar to the first embodiment, in the case of the fourth embodiment, the solenoid 148 may be included, and a method of controlling operation states of the camera module 26 and the puddle lamp module 36 may be similar to that of the first embodiment.

According to embodiments of the present disclosure, a camera for an SVM and a puddle lamp share a lens part and are integrated into one module. Accordingly, costs are reduced, weight is smaller than the total weight of individual modules, watertightness and quality are easily secured, and particularly, the installation space is minimized, and thus, the size of the side mirror is reduced. Moreover, an integrated module according to the present disclosure contributes to miniaturization of the CMS.

What is claimed is:

1. A camera-puddle lamp integrated apparatus comprising:
   a lens module;
   an image sensor spaced apart from the lens module with a first area therebetween;
   a light source located in a second area outside the first area and configured to emit light that intersects an optical axis of the lens module in the first area; and
   a translucent mirror, wherein:
      at least a portion of the emitted light is incident to the lens module by the translucent mirror and projected through the lens module so that the camera-puddle lamp integrated apparatus operates as a puddle lamp, and
      image light from a photographing area passes through the lens module and at least a portion of the image light is incident on the image sensor through the translucent mirror so that the camera-puddle lamp integrated apparatus operates as a camera.

2. The camera-puddle lamp integrated apparatus of claim 1, wherein:
   a central axis of the light emitted from the light source passes through the first area and extends to a first position outside the image sensor, and
   the light source further includes a reflector positioned at the first position.

3. The camera-puddle lamp integrated apparatus of claim 2, wherein the emitted light reflected by the reflector is incident on the lens module.

4. The camera-puddle lamp integrated apparatus of claim 3, wherein the reflector comprises a concave mirror.

5. The camera-puddle lamp integrated apparatus of claim 4, wherein the concave mirror has a parabolic shape.

6. A vehicle side mirror comprising the camera-puddle lamp integrated apparatus of claim 1.

7. A vehicle side mirror comprising the camera-puddle lamp integrated apparatus of claim 2.

8. A vehicle side mirror comprising the camera-puddle lamp integrated apparatus of claim 3.

9. A vehicle side mirror comprising the camera-puddle lamp integrated apparatus of claim 4.

10. A vehicle side mirror comprising the camera-puddle lamp integrated apparatus of claim 5.

* * * * *